(12) United States Patent
Hente

(10) Patent No.: US 6,781,259 B2
(45) Date of Patent: Aug. 24, 2004

(54) ELECTRICAL APPARTUS HAVING AN ACTUATOR

(75) Inventor: Dirk Hente, Wuerselen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/922,144

(22) Filed: Aug. 3, 2001

(65) Prior Publication Data

US 2002/0047325 A1 Apr. 25, 2002

(30) Foreign Application Priority Data

Aug. 4, 2000 (DE) .......................... 100 38 209

(51) Int. Cl.⁷ .............................................. H02K 41/00
(52) U.S. Cl. ........................... 310/12; 310/13; 310/256
(58) Field of Search ............................ 310/12–39, 256, 310/47, 50

(56) References Cited

U.S. PATENT DOCUMENTS

| | | | | |
|---|---|---|---|---|
| 3,493,793 A | * | 2/1970 | Niemela ..................... 310/29 |
| 3,614,491 A | * | 10/1971 | Anna et al. ................. 310/37 |
| 3,898,732 A | * | 8/1975 | Krainer ........................ 30/42 |
| 4,760,297 A | * | 7/1988 | Schemmann et al. ...... 30/43.92 |
| 4,808,892 A | * | 2/1989 | Dreibelbis .................. 318/135 |
| 4,951,023 A | * | 8/1990 | Erd et al. ................... 335/222 |
| 5,038,062 A | * | 8/1991 | Shiraki ........................ 310/39 |
| 5,057,723 A | * | 10/1991 | Umehara et al. ............ 310/12 |
| 5,263,218 A | * | 11/1993 | Giuliani et al. ............. 15/22.1 |
| 5,424,591 A | * | 6/1995 | Kuriyama .................... 310/12 |
| 5,459,359 A | | 10/1995 | Umehara ..................... 320/13 |
| 5,521,778 A | * | 5/1996 | Boutaghou et al. ....... 360/264.5 |
| 5,698,911 A | * | 12/1997 | Dunfield et al. ............. 310/12 |
| 5,731,642 A | * | 3/1998 | Ogawa ........................ 310/13 |
| 5,736,797 A | * | 4/1998 | Motohashi et al. .......... 310/36 |
| 5,796,558 A | * | 8/1998 | Hanrahan et al. ........ 360/294.6 |
| 5,822,156 A | * | 10/1998 | Suzuki et al. ............ 360/264.8 |
| 5,847,903 A | * | 12/1998 | Ogawa et al. ........... 360/264.8 |
| 6,157,099 A | * | 12/2000 | Hartman ...................... 310/12 |
| 6,188,149 B1 | * | 2/2001 | De Jager et al. ............. 310/12 |
| 6,249,064 B1 | * | 6/2001 | Bradbury ..................... 310/22 |
| 6,421,208 B1 | * | 7/2002 | Oveyssi ....................... 310/15 |

* cited by examiner

Primary Examiner—Dang D Le
(74) Attorney, Agent, or Firm—Ernestine C. Bartlett

(57) ABSTRACT

The invention relates to an electrical apparatus having an actuator including at least two permanent magnets (1, 1*a*) and at least one electrical coil (2) which is movably supported by means of a swing arm (3), which coil is arranged to be traversed by magnetic fields of the permanent magnets (1, 1*a*), the actuator having a cage (4), which encloses the coil (2) and the permanent magnets (1, 1*a*), as a closed magnetic return path.

13 Claims, 4 Drawing Sheets

ELECTRICAL APPARTUS HAVING AN ACTUATOR

Figure 1:
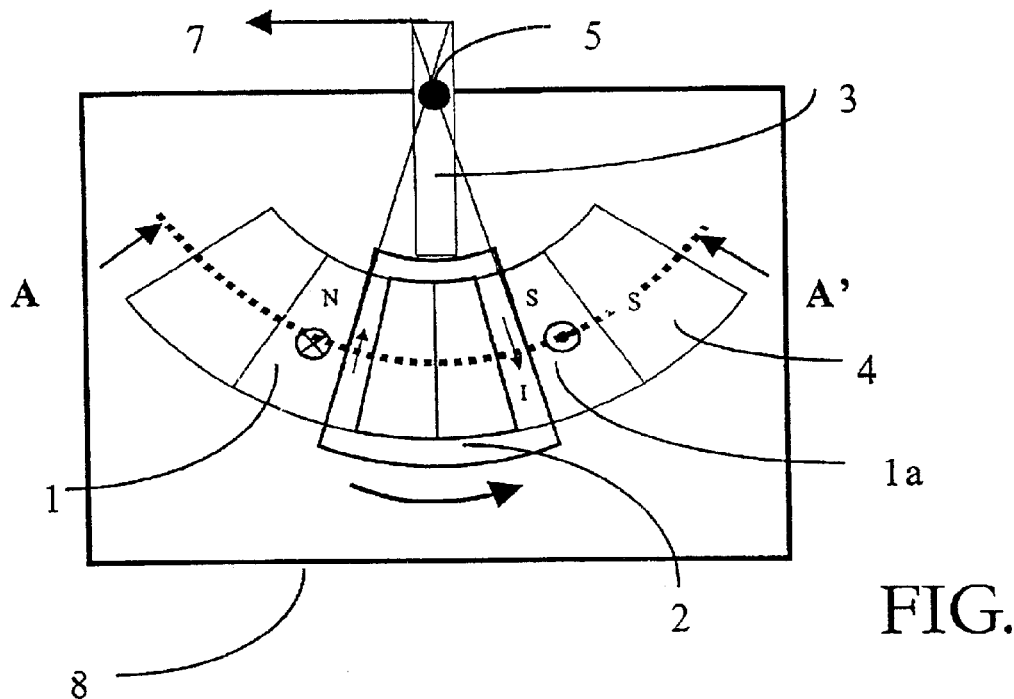

The invention relates to an electrical apparatus having an actuator including at least two permanent magnets and at least one electrical coil which is movably supported by means of a swing arm.

An actuator having a moving coil is known from the document U.S. Pat. No. 5,459,359. It has a permanent magnet facing a ferromagnetic yoke. The two elements are held together by a synthetic-resin housing. A coil can oscillate in a parallel mode in the gap between the magnet and the yoke. For this purpose, the coil is pivotably supported with the aid of an arm. The oscillations of the coil are controlled by the current fed though this coil and serve for driving electrical appliances.

It is an object of the invention to improve the efficiency of an actuator of the type defined in the opening paragraph and, at the same time, to minimize the emergence of magnetic stray fields to the environment of the actuator.

According to the invention the object is achieved in that in an electrical apparatus having such an actuator including at least two permanent magnets and at least one electrical coil which is movably supported by means of a swing arm, which coil is arranged to be traversed by magnetic fields of the permanent magnets, this actuator has a cage, which encloses the coil and the permanent magnets, as a closed magnetic return path.

The substantially perpendicular passage of flux through the coil in conjunction with the magnetic return via the iron path of the cage enables a particularly efficient operation of such an actuator because the air gap in the magnetic circuit is very small.

In one embodiment, the cage is made of soft-iron or steel and is shaped so as to shield the magnetic stray fields of the magnets. This embodiment ensures that, as a result of the return path which is formed by a ferromagnetic metal, such as soft-iron and which encloses the coil and the magnets, only a small portion of the magnetic stray field can emerge from the gap between the cage, the coil and the magnets.

In another embodiment, the swing arm—which is secured to the coil—is supported on a pivot, and the pivot is arranged at an inner side of the permanent magnet, which is sector-shaped. This embodiment enables a simple and direct transmission of the reciprocatory oscillating movement to a device or load to be driven. It does not require a transmission gear as in the case of an electric motor. Thus, a vibrating shaving head can be driven directly. This provides an efficient and low-maintenance drive. Moreover, it enables the oscillation properties of the actuator to be varied easily. The coil is secured to one end of the swing arm, the load to be driven being secured to the other end. The torque of the actuator and the oscillation frequency of the actuator can be influenced in accordance with the ratio between the distances of the coil and the load to be driven from the pivot.

In still another embodiment, the swing arm, which is supported on a pivot, is preloaded with respect to a housing by means of a torsion spring. In a further embodiment, the swing arm is preloaded with respect to a housing by means of at least one blade spring. These embodiments define a possibility of how to cause the swing arm to return automatically to the center position upon excursions to either side. For this purpose, a torsion spring may be arranged around the pivot, which spring has one end connected to the swing arm and its other end to the housing of the actuator. This provides a permanent return force for the excursions of the swing arm. Alternatively, the swing arm may be pre-loaded by means of two lateral blade springs, which are preferably secured to the load. Thus, it is possible to attain a higher preload than with the torsion spring but the construction is slightly more complicated.

In yet another embodiment, at least a second pivot is arranged at the outer side of the sector-shaped permanent magnets. At least one pivotal joint is present, which pivotal joint couples a first swing arm supported on the first pivot and a second swing arm supported on the second pivot in a pivotable manner and so as to be slidable with respect to another. The pivots are secured to a housing. This embodiment enables larger amplitudes of the swing arm to be obtained, without more room being required by the arrangement. For this purpose, the sector-shaped magnetic circuit is arranged so as to be 180° rotated with respect to the load or device to be driven, as a result of which the load is now disposed at the outside of the sector. In addition, the swing arm is divided into two parts, each of the two parts being mounted on a pivot. The two swing arm parts being linked via a pivot, which in addition is arranged so as to be movable in a longitudinal direction in at least one of the swing arm parts.

In yet a further embodiment the pivot is replaced with a point of attachment to a housing, where the swing arm is attached by means of a blade spring. This embodiment provides an alternative to mounting of the swing arm with the coil by means of pivots. In the present case the swing arm consists at least partly of a blade spring, which can be deflected by the coil secured to one of its ends. Such an arrangement does not have any rotatable parts and can be manufactured particularly cost-effectively.

In yet a still further embodiment, the bounding surface of the cage, which originally extend parallel to the plane of oscillations of the coil, taper toward the side that is remote from the pivot, and the bounding surfaces of the coil and the magnets are adapted accordingly. Advantageously, at its side that is remote from the pivot, the cage may have a shielding wall having an opening in the area of the magnets. These embodiments provide a further reduction of the basically low electromagnetic emission by the coil, through which an alternating current flows, and the magnetic stray field of the permanent magnets. Thus, it is also possible to adhere to more stringent future limits without any problems.

In yet still another further embodiment makes the embodiments listed above are made suitable for use in an electric shaver, which enables said shaver to be of a particularly cheap and robust construction.

Figure 2:
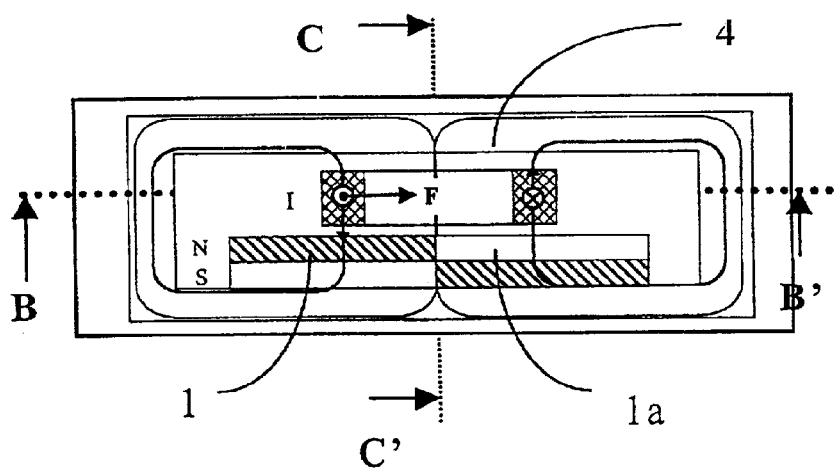
Figure 2A:
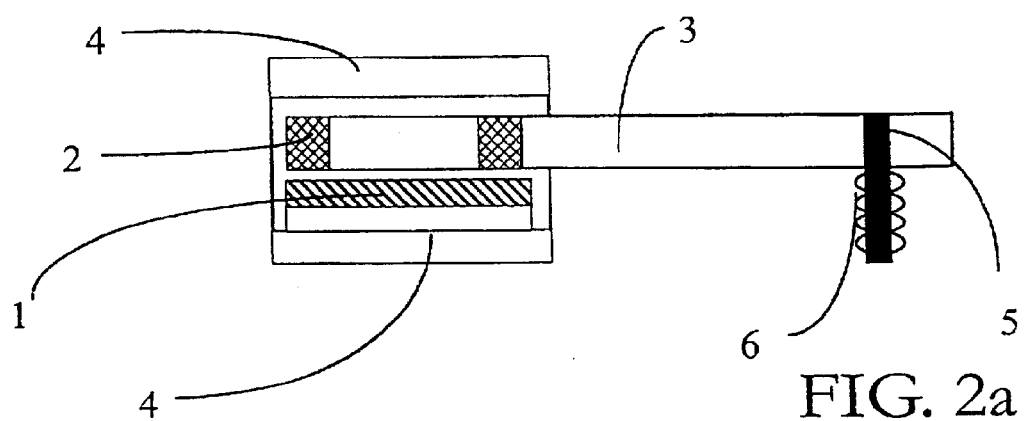
Figure 3:
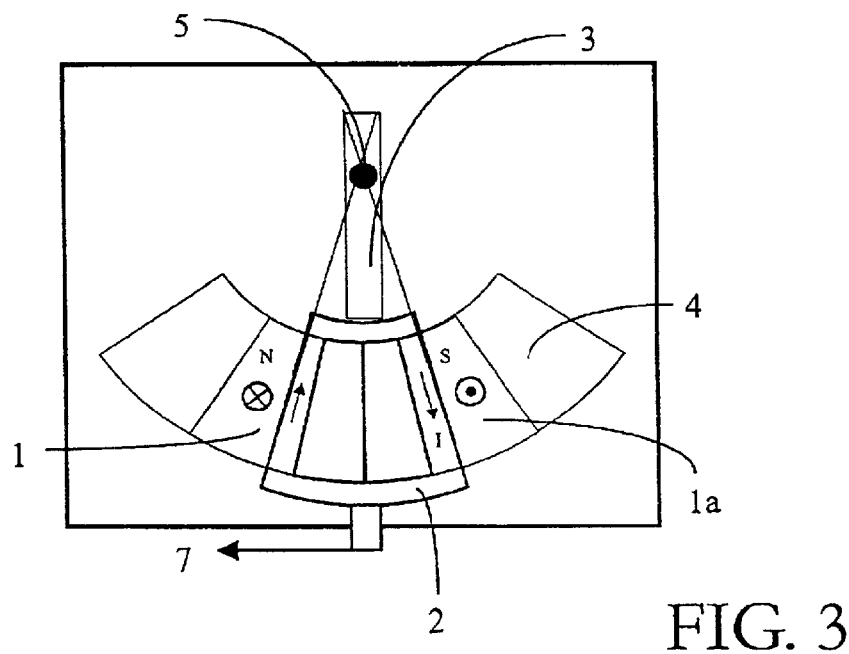
Figure 4:
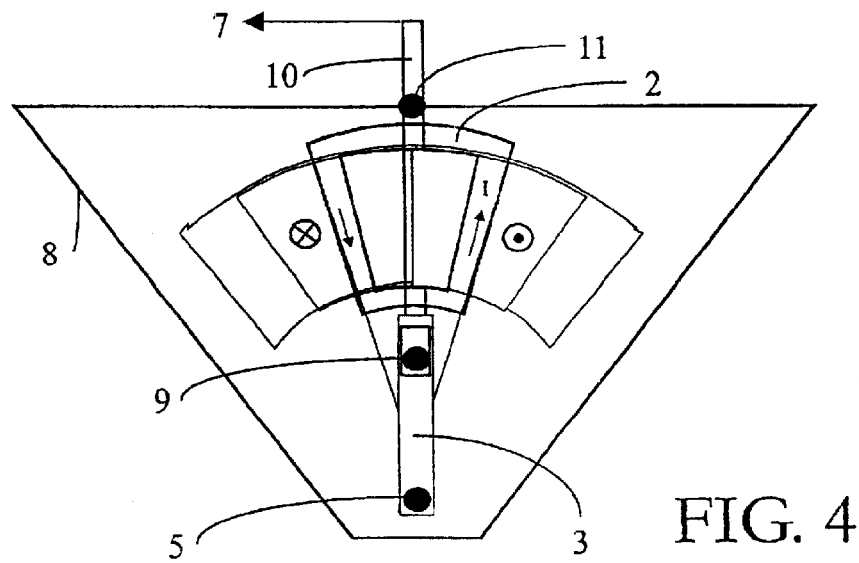
Figure 4A:
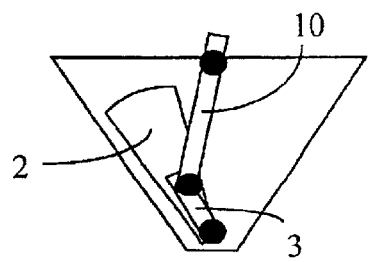
Figure 5:
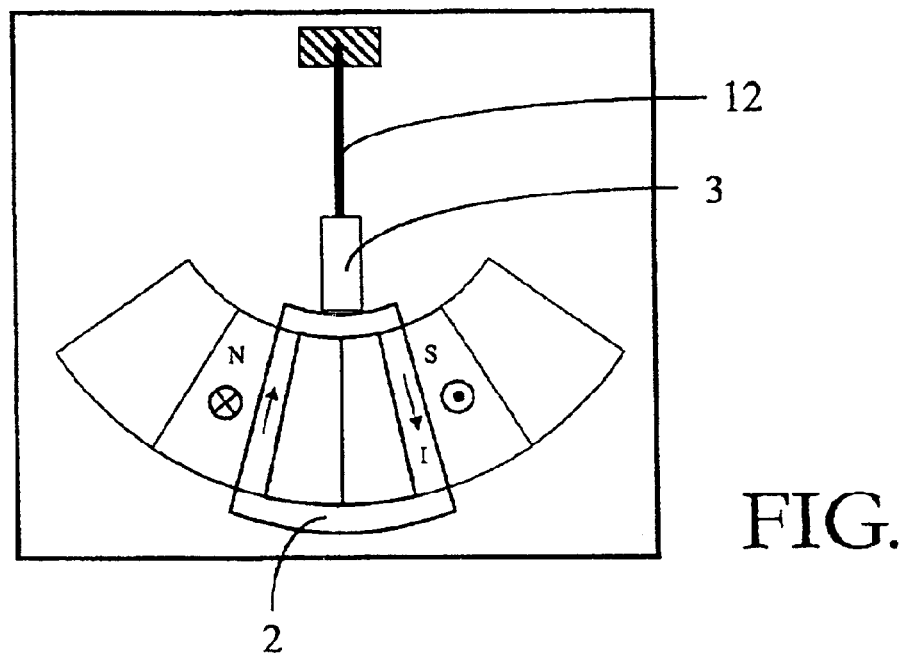
Figure 6:
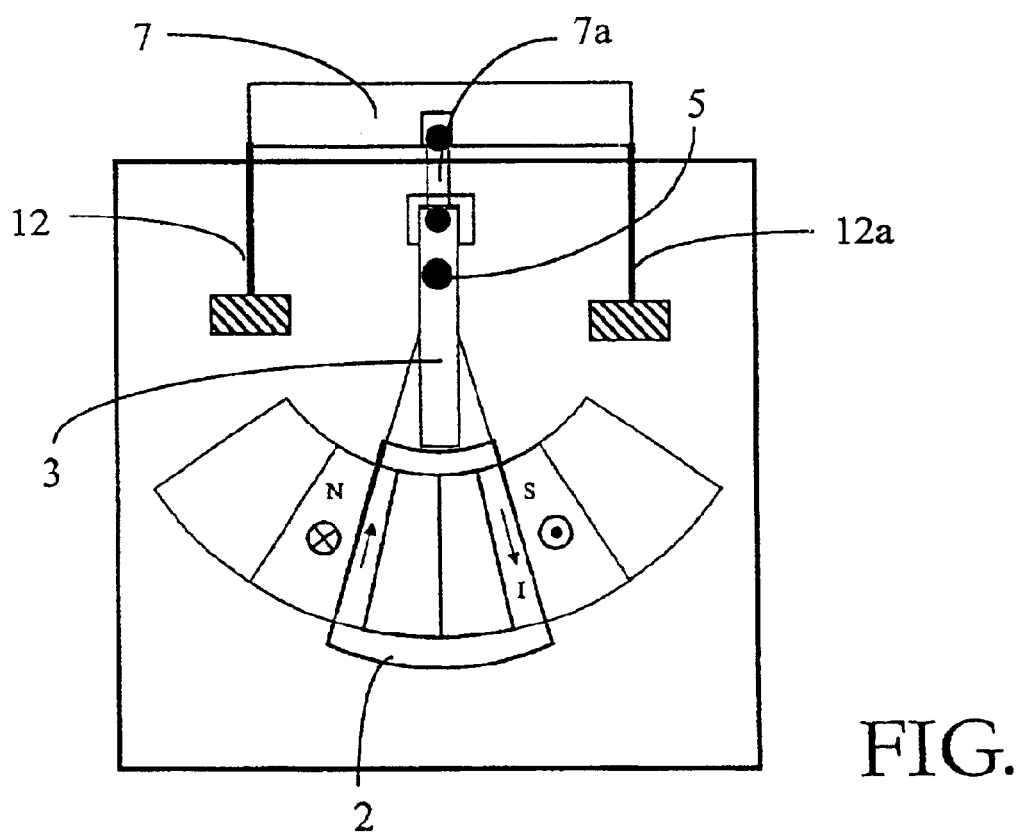
Figure 7:
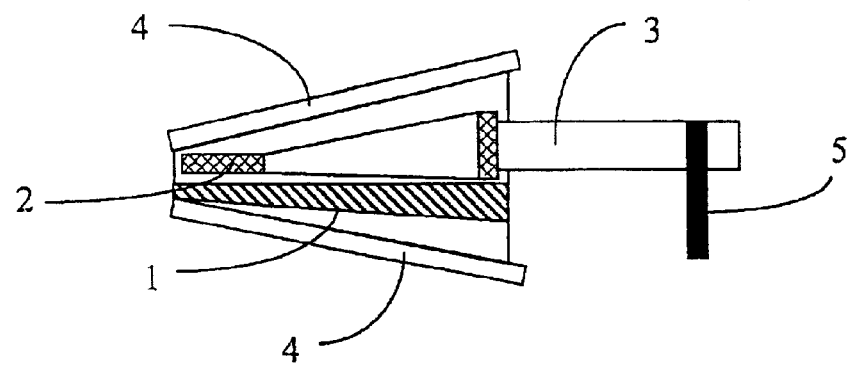
Figure 8:
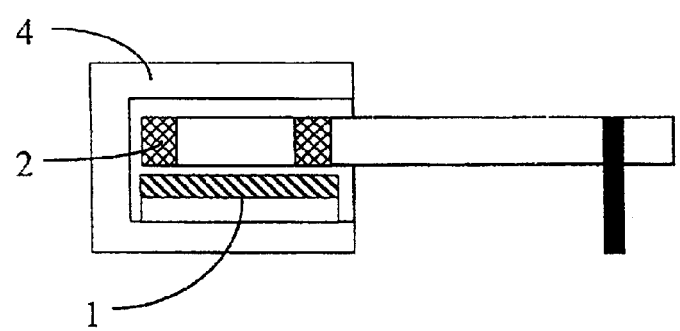
Figure 8A:
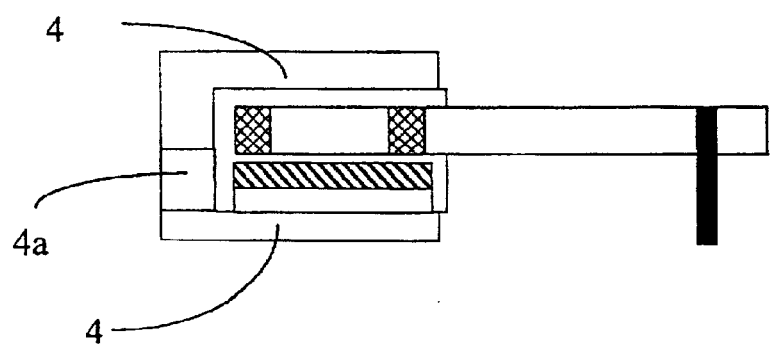

Embodiments of the invention will now be described in more detail, by way of example, with reference to the drawings. In the drawings:

FIG. 1 shows an actuator in accordance with the invention in plan view; the load to be driven is now arranged at that side of the swing arm which is remote from the coil, FIG. 2 is a cross-sectional view of the actuator, taken on the line A–A' in FIG. 1, FIG. 2a is a longitudinal sectional view of the actuator, taken on the line C–C' in FIG. 1, FIG. 3 shows an actuator which drives the load from that side of the swing arm which faces the coil, FIG. 4 shows an actuator having a two-part swing arm and two pivots, FIG. 4a shows the actuator of FIG. 4 in a deflected condition, FIG. 5 shows an actuator whose swing arm is mounted on a blade spring, FIG. 6 shows an actuator whose swing arm is mounted on a pivot and which is returned to its center position via two blade springs, FIG. 7 shows an actuator with inclined bounding surfaces of the coil, cage and magnets, FIG. 8 shows an actuator whose cage has an additional shielding wall, and FIG. 8a shows the actuator of FIG. 8 with a recess in the additional shielding wall.

The actuator shown in FIG. 1 consists of a sector-shaped arrangement which comprises a cage 4, which is open to at least one side, and two permanent magnets 1, 1a mounted in its interior. A coil 2 is arranged in the cage 4, which coil can move in the sector direction. For this purpose, the coil 2, which has at least one turn, is carried by a swing arm 3 so as to be pivotable about a pivot 5, which is disposed at the inner side of the sector outside the cage 4. In operation an alternating current flows through the coil 2, which current is provided either by the mains or by a battery or a storage battery in conjunction with an inverter. The two permanent magnets 1, 1a are oriented in such a manner that their magnetic fields pass perpendicularly through the turn(s) of the coil 2. The juxtaposed permanent magnets 1, 1a are arranged oppositely, in such a manner that always a north pole is disposed adjacent a south pole. The magnetic flux circuit is closed by the metal cage 4 via the air gap between the coil 2 and the permanent magnets 1, 1a, and via the air gap between the coil 2 and the roof of the cage 4. Since the air gaps are very narrow and magnetic fields in them are consequently quite homogeneous, this drive is very effective. This is also enhanced by the low mass of the coil 2 and the swing arm 3. FIGS. 2 and 2a are sectional views through the actuator taken perpendicularly to the magnetic fields. The actuator is mounted in a housing 8, which accommodates the cage 4 and the supporting means 5 for the swing arm 3. This housing 8 may be a separate housing for the actuator but it may likewise be the housing of an electrical apparatus. Instead of in the housing 8 the actuator may be mounted on a mounting plate situated in the outer housing of the electrical apparatus.

The load 7 to be driven by the oscillatory movement of the actuator may then be arranged on the end of the swing arm 3 remote from the coil 2, as is shown in FIG. 1. This results in small oscillation amplitudes, but as a result of the leverage of the arm 2 a large torque is obtained. By contrast, in the situation shown FIG. 3, the load is arranged outside the sector at the outer side near the coil 2. This leads to larger excursions during the oscillatory movement at the load 7 but it reduces the torque.

The actuator shown in FIG. 4 has two swing arms 3, 10, which are each pivotable about a pivot 5 or 11, respectively. Moreover, the two swing arms 3, 10 are pivotable about a common pivot 9 and are coupled so as to be slidable with respect to one another. This enables an excursion of the coil 2 secured to the swing arm 3, which does not drive the load 7 directly. FIG. 4a shows the arrangement in a deflected condition. Since the cage 4 with the magnets 1, 1a and the moving coil 2 is arranged between the pivots 5, 11 a particularly compact and space-saving construction is obtained in conjunction with a trapezoidal housing 8. Moreover, such an arrangement makes it possible to obtain a large torque with small excursions.

Instead of a swing arm 3 supported on a pivot 5 it is possible to use a shorter swing arm 3 in combination with a blade spring 12. As is shown in FIG. 5, the blade spring 12 has one end secured to the housing 8, the other end carrying the shorter swing arm 3 or rather carrying the coil 2 directly.

The arrangement shown in FIG. 6 is a combination of the swing arm 3 supported on a pivot 5 and the variant with a blade spring 12, but in the present case use is made of two blade springs 12, 12a. The two blade springs 12, 12a act upon the load 7 to be moved and at the other end they are each connected to the outer housing 8 via fixing parts. The load 7 itself is connected to the swing arm 3 via a coupling 7a. Such an arrangement ensures that the load 7 always moves parallel to the housing 8, which is interesting, for example, for its use in a shaver.

Since magnetic stray fields are produced, it is advantageous to restrain these by further shielding. To achieve this, there are various possibilities. First of all, the emergence of magnetic stray fields is reduced already in that the metal cage 4 only allows emerging via the thin gap between the coil 2, the cage 4 and the magnets 1, 1a. When the cage 4, the coil 2 and the magnets 1, 1a have an outwardly tapered shape as shown in FIG. 7, the exit opening becomes smaller towards the outside. However, the arrangement may also be given its original shape when the cage 4 has only one opening for the swing arm 3. This also reduces the emergence of magnetic stray fields. However, a disadvantage of this arrangement shown in FIG. 8 is the reduction of the magnetic field in the air gap. In order to avoid this, it is useful to leave a small gap 4a in the height direction of the magnets 1, 1a, so that the magnetic field in the air gap is not reduced unnecessarily.

The spring elements 6, 12 and 12a that are used can perform several functions. When they are adjusted to the low movable mass of the actuator consisting of the coil 2 and the swing arms 3, 5, they add to an increased efficiency. This is particularly so if the moving masses and the spring elements 6, 12, 12a operate in a resonant mode. Furthermore, the blade springs 12, 12a can also serve as current supply leads for the coil 2, if they are made of an conductive material or are coated with such a material. In order to preclude vibrations the effective mass of the load should also be adjusted to the movable mass of the actuator. If the driven load 7, as is shown in FIG. 1, then moves oppositely to the coil 2 and the swing arm 3 and the load is disposed in the same plane as the last-mentioned elements, there will be no vibrations at all in the ideal case.

What is claimed is:

1. An electrical apparatus comprising an actuator including at least two permanent magnets (1, 1a) and at least one electrical coil (2) which is movably supported by means of a swing arm (3), which coil is arranged to be traversed by magnetic fields of the permanent magnets (1, 1a), the actuator having a cage (4), which encloses the coil (2) and the permanent magnets (1, 1a), as a closed magnetic return path, further comprising means for exerting a permanent return force for the excursions of the swing arm, wherein the means for exerting a permanent return force comprises a single spring.

2. An electrical apparatus as claimed in claim 1, characterized in that the cage (4) is made of soft-iron or steel and is shaped so as to shield the magnetic stray fields of the magnets (1, 1a).

3. An electrical apparatus as claimed in claim 1, characterized in that the swing arm (3), which is secured to the coil (2) is supported on a pivot(5), and the pivot (5) is arranged at an inner side of the permanent magnets (1, 1a), which are sector-shaped.

4. An electrical apparatus as claimed in claim 1, characterized in that the swing arm (3), which is supported on a pivot (5), is preloaded with respect to a housing (8) by means of a torsion spring (6).

5. An electrical apparatus as claimed in claim 1, characterized in that the swing arm (3) is preloaded with respect to a housing (8) by means of at least one blade spring (12).

6. The apparatus of claim 1, wherein there is only a single swing arm.

7. The apparatus of claim 6, further comprising:
a housing; and
a pivot; and
wherein:
the coil is mounted on the swing arm;
the swing arm is fixed to a pivot; and
the pivot is mounted on the housing outside the cage.

8. The apparatus of claim 7, wherein the swing arm is adapted to drive a load on an end of the swing arm that is remote from the coil.

9. The apparatus of claim 7, wherein
the permanent magnets are sector shaped; and
the apparatus further comprises a load to be driven by the swing arm, which load is outside the sector shaped magnets.

10. The apparatus of claim 1, wherein the permanent magnets are sector shaped.

11. An electrical apparatus comprising
a swing arm;
at least two permanent magnets;
at least one electrical coil, movably supported by the swing arm, which coil is arranged to be traversed by magnetic fields of the permanent magnets; and
a cage, enclosing the coil and the permanent magnets, which cage acts as a closed magnetic return path, characterized in that
the permanent magnets are sector shaped;
the apparatus comprises at least first and second swing arms;
at least a second pivot (11) is arranged at the outer side of the sector-shaped permanent magnets (1, 1a), and
at least one pivotal joint (9) is present, which pivotal joint couples the first swing arm (3) supported on a first pivot (5) sod the second swing arm (10) supported on the second pivot (11) in a pivotable manner and so as to be slidable with respect to one another, the pivots (5, 11) being secured to a housing (8)
wherein the first pivot point is at an opposite side of the sector-shaped magnet from the second pivot point.

12. An electrical apparatus comprising
a swing arm;
at least two permanent magnets;
at least one electrical coil, movably supported by the swing arm, which coil is arranged to be traversed by magnetic fields of the permanent magnets;
a cage, enclosing the coil and the permanent magnets, which cage acts as a closed magnetic return path;
characterized in that
the bounding surfaces of the cage (4), which would otherwise extend parallel to the plane of oscillation of the coil (2), taper towards the side that is remote from the pivot (5), and the bounding surfaces of the coil (2) and the magnets (1, 1a) are adapted accordingly.

13. An electrical apparatus as claimed in any one of the claims 1 through 11 or 13, characterized in that the electrical apparatus is an electrically driven shaving apparatus.

* * * * *